United States Patent
Kuzminskiy et al.

(10) Patent No.: US 7,512,096 B2
(45) Date of Patent: Mar. 31, 2009

(54) COMMUNICATING DATA BETWEEN AN ACCESS POINT AND MULTIPLE WIRELESS DEVICES OVER A LINK

(75) Inventors: Alexandr Kuzminskiy, Swindon (GB); Hamid Reza Karimi, Swindon (GB); Kin Leung, London (GB)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 786 days.

(21) Appl. No.: 10/996,617

(22) Filed: Nov. 24, 2004

(65) Prior Publication Data

US 2006/0109814 A1 May 25, 2006

(51) Int. Cl.
*H04Q 7/24* (2006.01)
(52) U.S. Cl. .................. 370/329; 370/468; 370/338
(58) Field of Classification Search .................. None
See application file for complete search history.

(56) References Cited

U.S. PATENT DOCUMENTS

| 7,006,529 B2 * | 2/2006 | Alastalo et al. ............. 370/468 |
| 2003/0231700 A1 | 12/2003 | Alamouti et al. ............ 375/144 |
| 2006/0164969 A1 * | 7/2006 | Malik et al. .................. 370/203 |

FOREIGN PATENT DOCUMENTS

EP 1263168 12/2002

OTHER PUBLICATIONS

European Search Report EP 05257051 dated Feb. 8, 2006.
"Downlink SDMA For Legacy IEEE 802.11A/G Mobile Stations: Acknowledgement Recovery and Channel Estimation" by Alexandr Kuzminskiy and Constantinos Papadias, Bell Laboratories, Lucent Technologies, 2005.

* cited by examiner

*Primary Examiner*—Erika A Gary (57) ABSTRACT

The present invention provides a method and an apparatus for communicating data over a network between a communication node, for example, an access point having a first and a second antenna and a first and a second mobile station. The method comprises weighting a first data at the access point to transmit the first data using the first and second antennas so that the first mobile station only receives the first data and weighting a second data at the access point to transmit the second data using the first and second antennas so that the second mobile station only receives the second data. A space division multiple access (SDMA) module may cause a transmission protocol to transmit the first data to the first mobile station on the downlink and transmit the second data to the second mobile station in parallel to the transmission of the first data on the downlink. In a telecommunication system, this substantially simultaneous transmission of the first and second data using a similar carrier frequency in a radio frequency communication over a wireless local area network (WLAN) may increase throughput of a downlink, for example, by a factor nominally equal to the number of antennas at an access point.

13 Claims, 10 Drawing Sheets

COMMUNICATING DATA BETWEEN AN ACCESS POINT AND MULTIPLE WIRELESS DEVICES OVER A LINK

BACKGROUND OF THE INVENTION

1. Field of the Invention

This invention relates generally to telecommunications, and more particularly, to wireless communications.

2. Description of the Related Art

Service providers are constantly exploring various ways to generate more revenue while meeting demands of customers in different network environments including Intranet, Extranet, and e-commerce applications. For instance, telecommunication service providers exchange fee-based wireless and wireline traffic between mobile users and communication nodes, such as access points (APs) over a network to provide a variety of services to residential and business customers. An access point may be a transceiver that connects devices on a wireless local area network (WLAN) to the wired infrastructure. While an access point may be used by service providers to assure end-to-end quality of service and bandwidth guarantees over different network environments, a telecommunication service provider may offer Internet Protocol (IP) telephony and other network enhanced communication services to these customers. In doing so, these providers may employ optical and wireless networks, Internet infrastructure, communications software to enable, for example, Web-based enterprise solutions that link private and public networks.

One well-known standard, i.e., the Institute of Electrical and Electronics Engineers (IEEE) 802.11 specification describes the operation of mobile stations (MSs) and access points in a Wireless Local Area Network (WLAN). For a layered communication network protocol, this specification identifies both the physical layer (PHY), which details the nature of the transmitted signals, as well as the medium access control (MAC) layer, which defines a complete management protocol for interaction between mobile stations and access points. For more detailed discussion on the IEEE 802.11 standard (std.), one may refer to "Wireless LAN Medium Access Control (MAC) and Physical Layer (PHY) specifications," published as IEEE std. 802.11, in 1999.

Specifically, at least three versions of the IEEE 802.11 standard exist, all sharing the same MAC 802.11b layer which operates in the 2.4 Giga Hertz (GHz) frequency band and has a PHY layer based on code division multiple access (CDMA), offering a peak data rate of 11 Mega bit per second (Mbits/s). The 802.11a and 802.11g versions operate in the 5.2 and 2.4 GHz bands respectively, both sharing a PHY layer based on orthogonal frequency division multiplexing (OFDM), offering a peak data rate of 54 Mbits/s. The IEEE 802.11 specification allows interoperability between wireless communication equipment from multiple vendors, and is commercially marketed as "Wi-Fi."

Space Division Multiple Access (SDMA) has been studied extensively over the past few decades as a tool that uses spatial dimension to simultaneously transmit to, or receive from, multiple radios at the same carrier frequency. For more detailed discussion on the use of the spatial dimension to allow discrimination among multiple radio, one may refer to A. T. Alastalo, M. Kahola, "Smart-antenna operation for indoor wireless local-area networks using OFDM", IEEE Transactions on Wireless Communications, vol. 2, no. 2, pp. 392-399, March 2003 and P. Vandenameele, L. Van Der Perre, M. G. E. Engels, B. Gyselinckx, H. J. De Man, "A combined OFDM/SDMA approach", IEEE Journal on Select Areas of Communications, vol. 18, no. 11 pp. 2312-2321, November 2000.

However, the application of SDMA to wireless mobile communication systems, especially to cellular systems, such as Global System of Mobile Communications (GSM), cdma2000 and Universal Mobile telecommunication Systems (UMTS) has not always been successful. While simple implementations in the form of a fixed sectorization have been found to be effective, more sophisticated schemes, such as dynamic beam-forming, have been difficult to implement due to serious incompatibilities with the multiple access protocols in the above-cited cellular systems. Therefore, the application of sophisticated techniques for increasing the data rates available to mobile stations on a downlink that both may comply with the IEEE 802.11a/g standard specifications has not been adequately addressed in the literature for many reasons.

Figure 3:
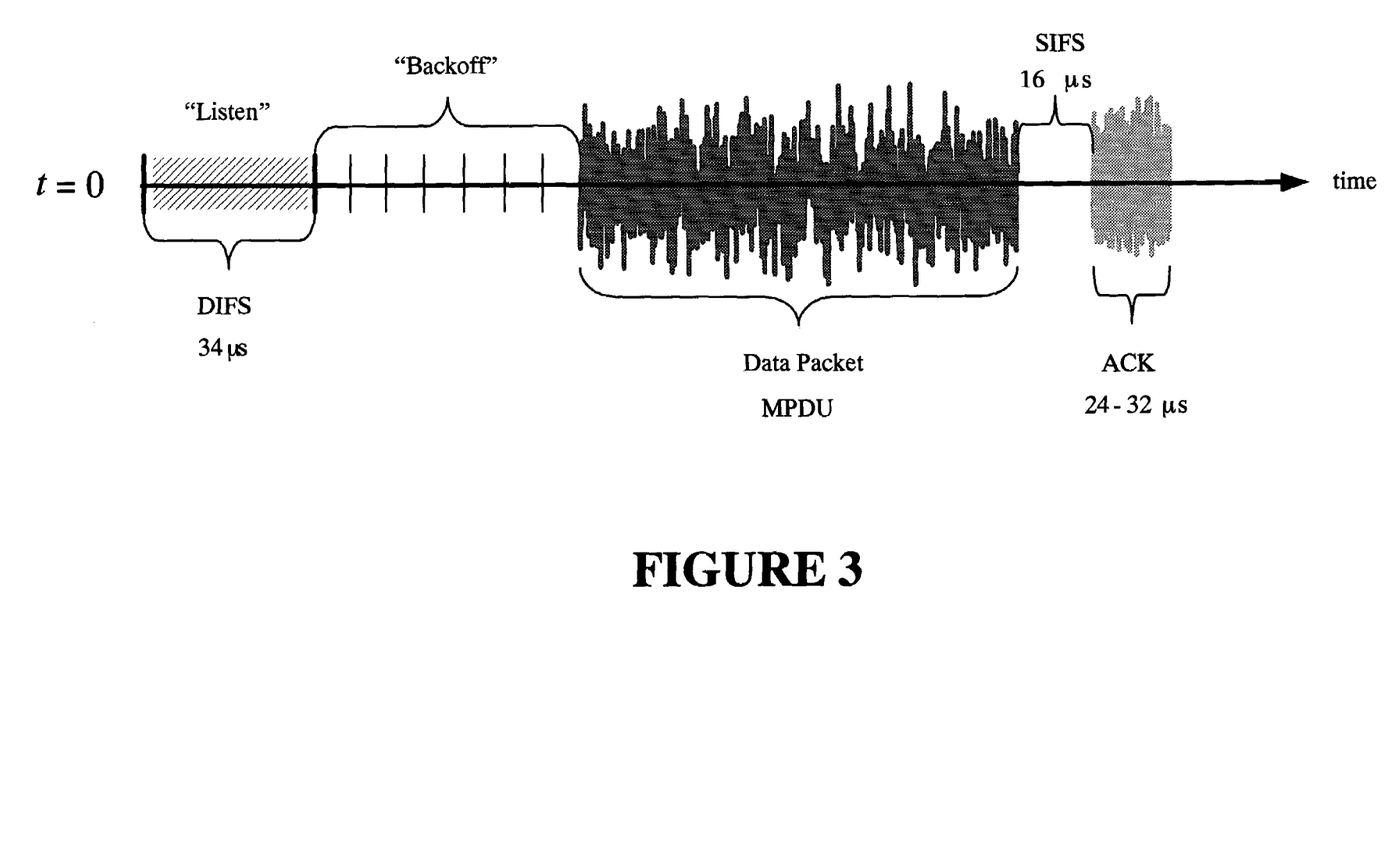
FIG. 3 illustrates a stylized representation of a transmission protocol defined at least in part by IEEE 802.11 standard between a transmitter and a receiver where the transmitter transmits a MAC protocol data unit (MPDU) following listening and backoff, and in turn, the receiver transmits an acknowledgment (ACK) frame subject to a successful reception of the MPDU.

One reason for a lack of a high throughput downlink is that in most wireless LANs, the radio conditions are different at a transmitter and a receiver. As shown, FIG. 3 illustrates a stylized representation of a transmission protocol defined at least in part by IEEE 802.11 standard between a transmitter and a receiver where the transmitter transmits a MAC protocol data unit (MPDU) following listening and backoff, and in turn, the receiver transmits an acknowledgment (ACK) frame subject to a successful reception of the MPDU. The transmitter has no way of knowing whether the transmitted data was received correctly at the receiver. To this end, the IEEE 802.11 specifications state that upon a successful reception of a data burst (i.e., an MPDU), the receiver should send an acknowledgment frame (ACK) to the transmitter as confirmation. Should the transmitter not receive an ACK frame, it will assume a lost MPDU and will attempt re-transmission. The time interval between the last symbols of the MPDU and the first symbol of the ACK frame is referred to as a Short Inter-frame Space (SIFS) interval and is fixed at 16 µs in IEEE 802.11 networks. While the duration of a MPDU is arbitrary, the duration of an ACK frame is between 24 and 44 µs, depending upon the modulation and coding PHY parameters.

More specifically, the IEEE 802.11 standard MAC protocol is based on carrier-sense multiple-access with collision-avoidance (CSMA/CA). This MAC protocol essentially describes a "listen before you talk" access mechanism, whereby a IEEE 802.11 radio (mobile or access point) listens to the communication medium before starting a transmission. If the communication medium is already carrying a transmission (i.e., the measured background signal level is above a specified threshold), the radio will not begin its transmission. In such circumstances, the radio enters a deferral mode, where it has to wait for a period over which the medium is idle before attempting to transmit. This period is the sum of a Deterministic Inter-frame Space (DIFS) interval (34 µs in 802.11a and g) and a stochastic backoff interval (a re-transmission delay) with discrete values uniformly distributed over a range. The value of this range doubles with every unacknowledged transmission, until a maximum limit is reached. Once a transmission is successfully received and acknowledged, the range is reduced to its minimum value for the next transmission.

Providing increased downlink throughputs to legacy IEEE 802.11 mobile stations is an important distinguishing feature and marketing tool. However, multiple acknowledgement (ACK) bursts from different mobile stations may cause a reception problem upon their arrival at an access point. Likewise, accurate channel estimations may severely impact on successfully increasing the downlink throughputs. Therefore, without requiring a modification to the legacy IEEE 802.11 compliant mobile stations, a substantial increase in data rates using a single carrier frequency is not readily apparent on a downlink from an access point to the mobile stations in a WLAN.

The present invention is directed to overcoming, or at least reducing, the effects of, one or more of the problems set forth above.

SUMMARY OF THE INVENTION

In one embodiment of the present invention, a method is provided for communicating data over a network between an access point having a first and a second antenna and a first and a second mobile station. The method comprises weighting a first data at the access point to transmit the first data using the first and second antennas so that the first mobile station only receives the first data and weighting a second data at the access point to transmit the second data using the first and second antennas so that the second mobile station only receives the second data.

In another embodiment, a communication node is associated with a network to communicate data to and from a first and a second mobile station. The communication node comprises a first and a second antenna, a controller and a memory storing instructions. The instructions cause the controller to weight a first data at the communication node to transmit the first data using the first and second antennas so that the first mobile station only receives the first data and weight a second data at the communication node to transmit the second data using the first and second antennas so that the second mobile station only receives the second data.

In yet another embodiment, a telecommunication system comprises an access point associated with a network to communicate data to and from a first and a second mobile station. The access point comprises a first and a second antenna, a controller and a memory storing instructions. The instructions cause the controller to weight a first data at the access point to transmit the first data using the first and second antennas so that the first mobile station only receives the first data and weight a second data at the access point to transmit the second data using the first and second antennas so that the second mobile station only receives the second data.

In still another embodiment, an article comprises a computer readable storage medium storing instructions that, when executed cause a telecommunication system to enable a communication node having a first and a second antenna to associate with a network to communicate data to and from a first and a second mobile station, weight a first data at the access point to transmit the first data using the first and second antennas so that the first mobile station only receives the first data and weight a second data at the access point to transmit the second data using the first and second antennas so that the second mobile station only receives the second data.

BRIEF DESCRIPTION OF THE DRAWINGS

The invention may be understood by reference to the following description taken in conjunction with the accompanying drawings, in which like reference numerals identify like elements, and in which.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Generally, a communication node, e.g., an access point includes a plurality of antennas that simultaneously transmit information on a downlink to a plurality of mobile stations, e.g., laptops or wireless personal digital assistants (PDAs), in a cell over a network including a wireless local area network (WLAN). Essentially, an access point may weight a first data at the access point to transmit a first data using a first and a second antenna so that the first mobile station only receives the first data and weight a second data at the access point to transmit a second data using the first and second antennas so that the second mobile station only receives the second data. In some embodiments, advantageously the present invention may be adopted at the access point for substantially increasing a SDMA downlink throughput in an IEEE 802.11 cell such that the increase in the throughput involve no modification to IEEE 802.11 standard compliant mobile stations. For example, a near doubling of the throughput via two antennas at the access point 105a may be obtained. In other embodiments, the use of the present invention may reduce the overlap of the mobile station acknowledgement (ACK) bursts upon their arrival at the access point, providing increased throughputs to IEEE 802.11 mobile stations. Furthermore, a doubling of data rates using a single carrier frequency may be obtained on the SDMA downlink for the IEEE 802.11 mobile stations. In this manner, the access point may provide an improved throughput on the SDMA downlink for a WLAN network in a telecommunication system.

Figure 1:
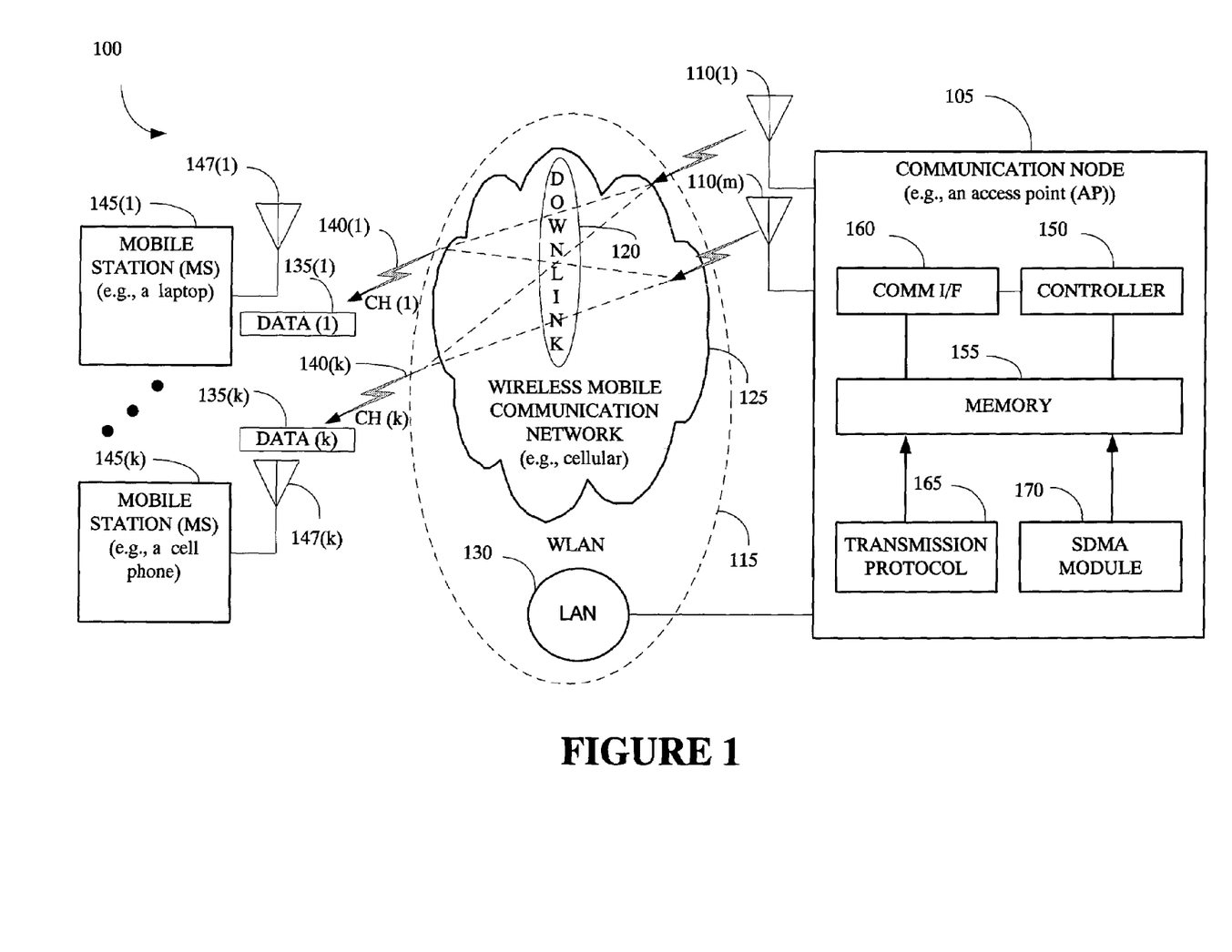
FIG. 1 illustrates a telecommunication system including a communication node (e.g., an access point) having multiple antennas for simultaneous wireless communications of corresponding data over a network to a plurality of mobile users on a downlink according to one illustrative embodiment of the present invention.

Referring to FIG. 1, a telecommunication system 100 includes a communication node 105 having a first antenna 110(1) and a second antenna 110(m) for a simultaneous wireless communication of data over a network including a wireless local area network (WLAN) 115 to a plurality of mobile users on a downlink 120 according to one illustrative embodiment of the present invention. In one embodiment, the communication node 105 may be an access point. For example, the access point may be a transceiver or a radio component in the WLAN 115 that operates as a transfer point between a wired and a wireless signal, and vice versa as a communication hub for users of a wireless device to connect to the WLAN 115. In other embodiment, the access point may be a base station that plugs into an Ethernet hub or to a server for a WLAN system cell, so that users may roam between access points. In another embodiment, the access point may operate as a bridge in a peer-to-peer connection.

Being an interface between a wireless mobile communication network 125 and a wired network, e.g., a local area network (LAN) 130 of the WLAN 115, in one embodiment, the communication node 105, i.e., the access point may support multiple radio cells. These cells may enable roaming of a plurality of mobile devices, e.g., WLAN personal digital assistants, throughout a service area, such as in a facility. In this manner, according to one embodiment, the communication node 105 may transmit information to and receive information from mobile users to provide a service. Examples of the service include wireless data services, cellular services, Internet Protocol (IP) telephony and other communication services. Using the communication node 105, i.e., the access point, service providers may offer a full spectrum of service solutions that can address their customers' needs in provisioning services over Intranet, Extranet, and e-commerce solutions.

In operation, at the communication node 105, i.e., the access point (AP), may weight a first data 135(1) at the communication node 105 to transmit the first data 135(1) using the first and second antennas 110(1-$m$) so that a first mobile station (MS) 145(1) only receives the first data 135(1) over a first radio channel (CH (1)) 140(1). The communication node 105 may weight a second data 135($k$) to transmit the second data 135($k$) in parallel to the first data 135(1) over a second radio channel (CH($k$)) 140(1) to a second mobile station (MS) 145($k$) during transmission of the first data 135 (1) using the first and second antennas 110(1-$m$) so that the second mobile station 145($k$) only receives the second data135($k$). The first mobile station 145(1) may include a first mobile antenna 147(1) to communicate with the communication node 105 and likewise, second mobile station 145($k$) may include a second mobile antenna 147($k$).

While an example of the first mobile station 145(1) may include a laptop computer, an example of the second mobile station 145($k$) may include a wireless personal digital assistant (PDA). In one embodiment, the communication node 105 may transmit the first and said second data 135(1-$k$) substantially simultaneously at a same carrier frequency in a radio frequency communication. This substantially simultaneous transmission of the data 135(1-$k$) may increase throughput of the downlink 120 by a factor nominally equal to the number of antennas, i.e., "m", at the communication node 105 or the access point.

According to one embodiment, the communication node 105 may comprise a controller 150 and a memory 155. The memory 155 may store instructions to cause the controller 150 to weight the first data 135(1) at the communication node 105 to transmit the first data 135(1) using the first and second antennas 110(1-$m$) so that the first mobile station 145(1) only receives the first data 135(1). The memory 155 may further store instructions to cause the controller 150 to weight the second data 135($k$) at the communication node 105 to transmit the second data 135($k$) using the first and second antennas 110(1-$m$) so that the second mobile station 145($k$) only receives the second data135($k$).

A communication interface 160 may be coupled to the controller 150 and the memory 155 to transmit the first and second data 135(1-$k$) substantially simultaneously. To this end, the memory 155 may further store a transmission protocol 160 and a space division multiple access (SDMA) module 170. The transmission protocol 160 may be responsible for forming data connections between the communication node 105 and the first and second mobile stations 145(1-$k$). The SDMA module 170 may cause the transmission protocol 160 to transmit the first data 135(1) to the first mobile station 145(1) on the downlink 120 and transmit the second data 135($k$) to the second mobile station 145($k$) in parallel to the transmission of the first data 135(1) on the downlink 120.

The SDMA module 170 may increase the capacity of the telecommunication system 100, e.g., a WLAN radio system by taking advantage of spatial separation between users. The communication node 105, e.g., a base station may not transmit a transmission signal to an entire cell area, rather concentrate power of the transmission signal for parallel transmission of the first and second data 135(1-$k$) on the downlink 120 in the direction of the first and second mobile stations 145(1-$k$), respectively. By taking advantage of a spatial characteristic pertaining to space on Earth's surface (e.g., referring to distances, directions, areas and other aspects of space) of the first and second antennas 110(1-$m$) at the communication node 105, the SDMA module 170 may provide simultaneous access to multiple users, such as in radio frequency (RF) communications.

Figure 2:
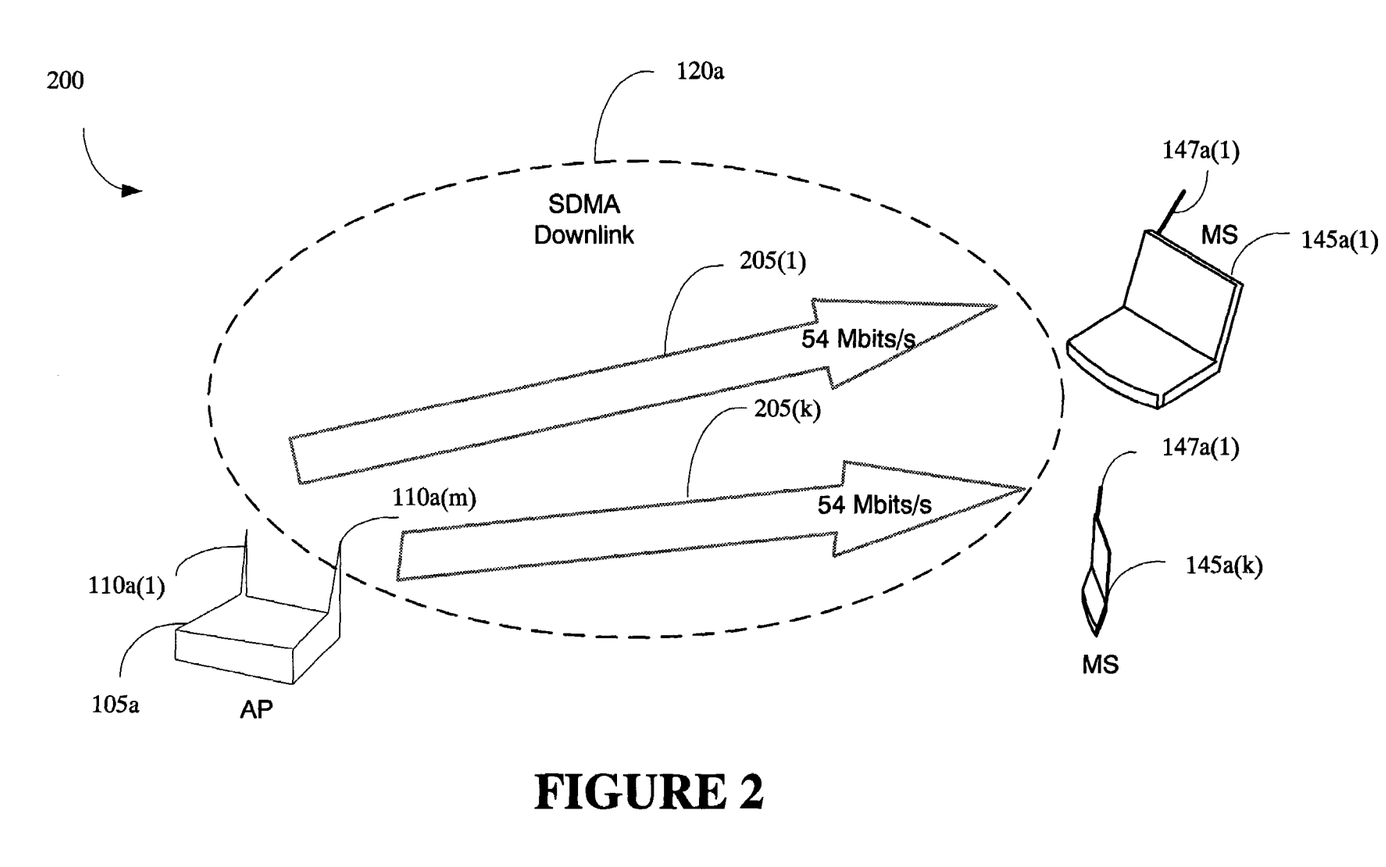
FIG. 2 illustrates a WLAN communication system including a SDMA downlink defined at least in part by IEEE 802.11 standard from the communication node (e.g., an access point) shown in FIG. 1 in accordance with one embodiment of the present invention.

Turning now to FIG. 2, a WLAN communication system 200 is shown to include a SDMA downlink 120$a$ defined at least in part by the IEEE 802.11 standard from an access point 105$a$ shown in FIG. 1 in accordance with one embodiment of the present invention. Using a multiplicity of antennas, i.e., a first and a second antenna 110$a$(1-$m$), the access point 105$a$ may transmit data including the first and second data 135(1-$k$) in parallel (e.g., simultaneously and at a same or single carrier frequency) to multiple IEEE 802.11a/g standard compliant wireless devices, i.e., a first and a second mobile station 145$a$(1-$k$) to first and a second antenna 147$a$(1-$k$), respectively. In this way, the SDMA downlink 120$a$ may effectively double the throughput of the SDMA downlink 120$a$.

In operation, the SDMA downlink 120$a$ may use the spatial dimension to allow discrimination among a first and a second radio frequency transmission 205(1-$k$) at a data rate of 54 Mbits/s based on space division multiple access in the context of the IEEE 802.11 standard. The access point 105$a$ may apply the transmission protocol 165 based on the SDMA module 170 to the first and second radio frequency transmissions 205(1-$k$) to transmit the first and said second data 135 (1-$k$) substantially simultaneously from the access point 105$a$ to the first and second mobile stations 145(1-$k$), respectively.

To couple the access point 105$a$ to the first and second mobile stations 145(1-$k$) through the WLAN 115, at least one of the access point 105$a$, the first and second mobile stations 145(1-$k$), and the SDMA downlink 120$a$ may be defined at least in part by Institute of Electrical and Electronics Engineers (IEEE) 802.11 standard to establish the network. The SDMA module 170 may estimate the first radio channel 140 (1) from the access point 105$a$ to the first mobile station 145(1) over a pilot interval and estimate the second radio channel 140($k$) from the access point 105$a$ to the second mobile station 145($k$) over the pilot interval. A pilot interval may be a predetermined time period for transmission of a signal, either at a single frequency or several independent frequencies, for supervisory purposes including control, equalization, continuity, synchronization, or reference. For example, the access point 105$a$ may transmit one or more pilot frequencies associated with a carrier frequency over the pilot interval.

Before starting the first and second radio frequency transmissions 205(1-$k$) of the first and second data 135(1-$k$) over the SDMA downlink 120$a$, the transmission protocol 165 may be initialized. This initialization may entail exchanging one or more protocol data units, such as MAC layer protocol or packet data units (MPDUs) and one or more acknowledgement (ACK) frames between the access point 105$a$ and the first mobile station 145(1) and the second mobile station 145($k$). For example, a PDU may be a data object exchanged by the transmission protocol 165 within a given layer of a communication network protocol stack. A PDU may comprise both protocol control information and user data. Likewise, an ACK frame may be an acknowledgement portion of the transmission protocol 165 responsible for acknowledging the receipt of a transmission. An ACK frame may be either a separate packet or a piggy back packet on reverse link traffic. An ACK frame may be sent to indicate that a block of data arrived at its destination without error. For example, an ACK frame may be used for an end-to-end flow control to verify receipt of one or more frames in a service.

Figure 4:
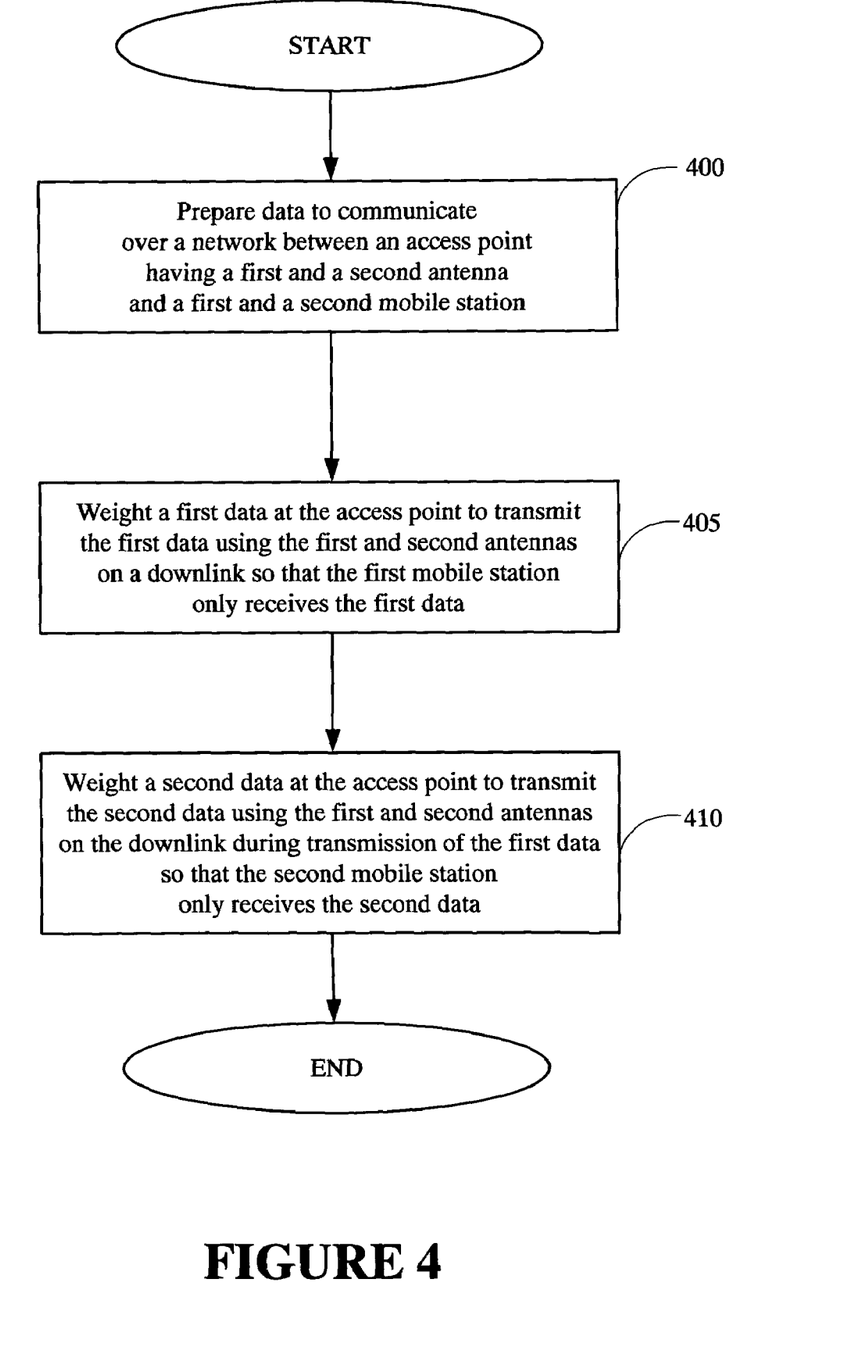
FIG. 4 illustrates a stylized representation of a flow chart implementing a method for communicating a first and a second data from a first and a second antenna at the communication node (e.g., an access point) to a first and a second mobile station on the SDMA downlink shown in FIG. 2 consistent with one embodiment of the present invention.

As shown, FIG. 4 illustrates a stylized representation of a flow chart implementing a method for communicating the first and second data 135(1-$k$) from the first and second antennas 110$a$(1-$m$) at the access point 105$a$ to the first and second mobile stations 145$a$(1-$k$) on the SDMA downlink 120$a$ shown in FIG. 2 consistent with one embodiment of the present invention. At block 400, the SDMA module 170 may prepare data to communicate over the WLAN 115 between the access point 105$a$ and the first and second mobile stations 145$a$(1-$k$).

The access point 105$a$ may weight the first data 135(1) to transmit same using the first and second antennas 110$a$(1-$m$) so that the first mobile station 145$a$(1) only receives the first data 135(1) on the SDMA downlink 120$a$, as depicted in block 405. Similarly, as indicated at block 410, the access point 105$a$ may weight the second data 135($k$) for transmitting the same on the SDMA downlink 120$a$. That is, the access point 105$a$ may transmit the second data 135($k$) using the first and second antennas 110$a$(1-$m$) so that the second mobile station 145$a$($k$) only receives the second data 135($k$) during the transmission of the first data 135(1) to the first mobile station 145$a$(1) on the SDMA downlink 120$a$, as shown in block 410.

Figure 5:
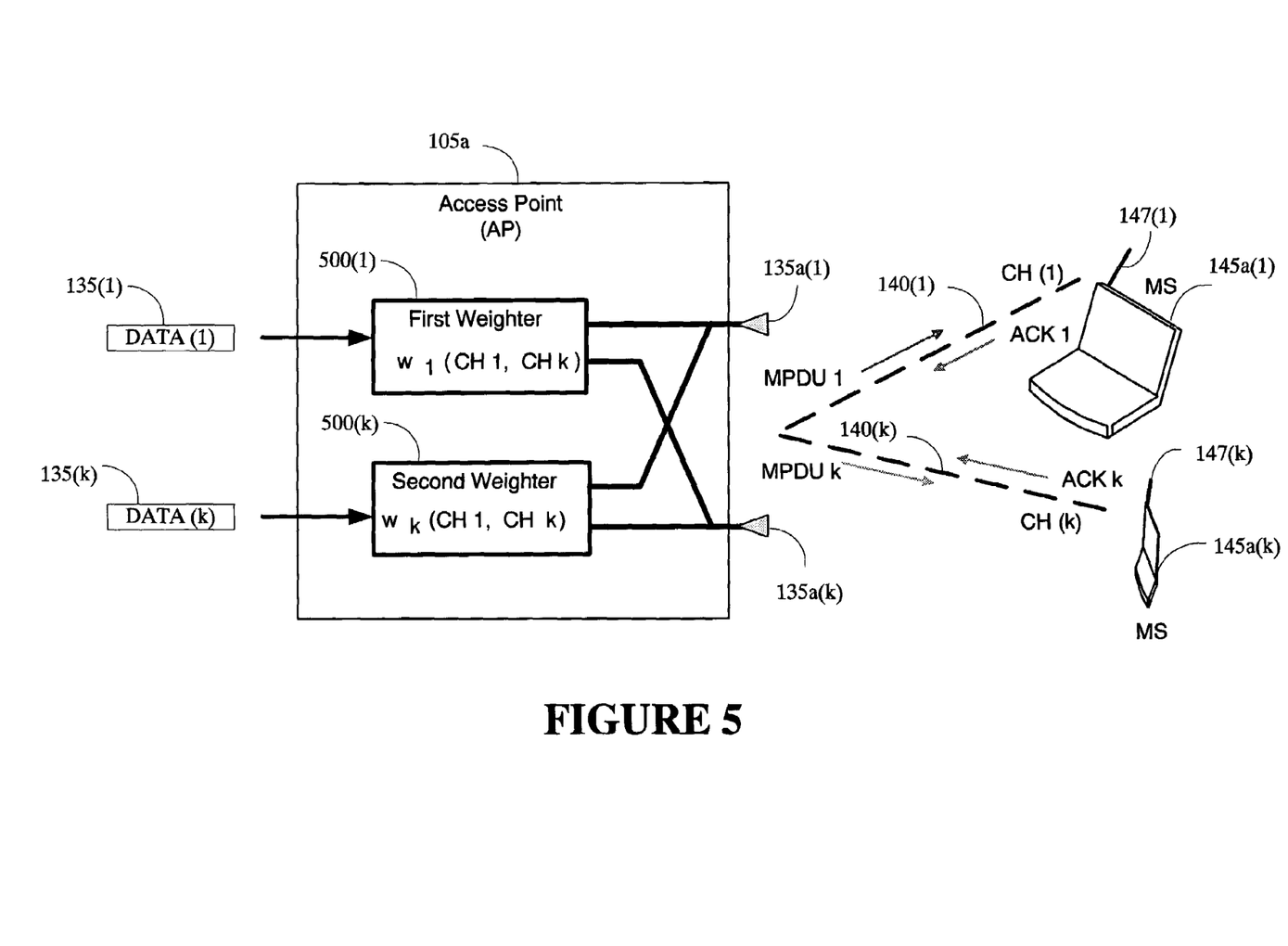
FIG. 5 illustrates a stylized representation for SDMA transmissions based on the IEEE 802.11 standard on the SDMA downlink shown in FIG. 2 to the first and second mobile stations with the first and second antennas at the communication node (e.g., an access point) according to one illustrative embodiment of the present invention.

Referring to FIG. 5, a stylized representation is depicted for SDMA transmissions based on the IEEE 802.11 standard over the SDMA downlink 120$a$ shown in FIG. 2 to the first and second mobile stations 145$a$(1-$k$) with the first and second antennas 110$a$(1-$m$) at the access point 105$a$ according to one illustrative embodiment of the present invention. The access point 105$a$ may comprise a first weighter 500(1) to weight the first data 135(1) based on channel estimates of the first and second radio channels 140(1-$k$) as "w1(CH (1), CH ($k$))." Likewise, the access point 105$a$ may comprise a second weighter 500($k$) to weight the second data 135($k$) based on channel estimates of the first and second radio channels 140 (1-$k$) as "wk (CH (1), CH ($k$))."

In operation, the weighted first and second data 135$a$(1-$k$) may be transmitted by both the antennas 110$a$(1-$k$) at the access point 105$a$ over the associated first and second radio channels 140(1-$k$) to the first and the mobile stations 145$a$(1-$k$) for selective reception. The MAC layer protocol or packet data units, MPDU (1-$k$), and the acknowledgement (ACK) frames, ACK (1-$k$) may be exchanged between the access point 105$a$ and the first mobile station 145$a$(1) and the second mobile station 145$a$($k$), respectively.

For simultaneous and co-channel transmission of independent data to the first and second mobile stations 145$a$(1-$k$), respectively, the access point 105$a$ may obtain up-to-date estimates of the first and second radio channels 140(1-$k$) from the access point 105$a$ to the first and second mobile stations 145$a$(1-$k$), respectively. That is, for the SDMA transmissions of the weighted first and second data 135$a$(1-$k$) to the first and second mobile stations 145$a$(1-$k$), respectively, with two (or more) antennas, i.e., the first and second antennas 110$a$(1-$m$) at the access point 105$a$, an initialization procedure for the SDMA downlink 120$a$, as shown in FIG. 2, based, at least in part, on the IEEE 802.11 standard may be initiated.

Figure 6:
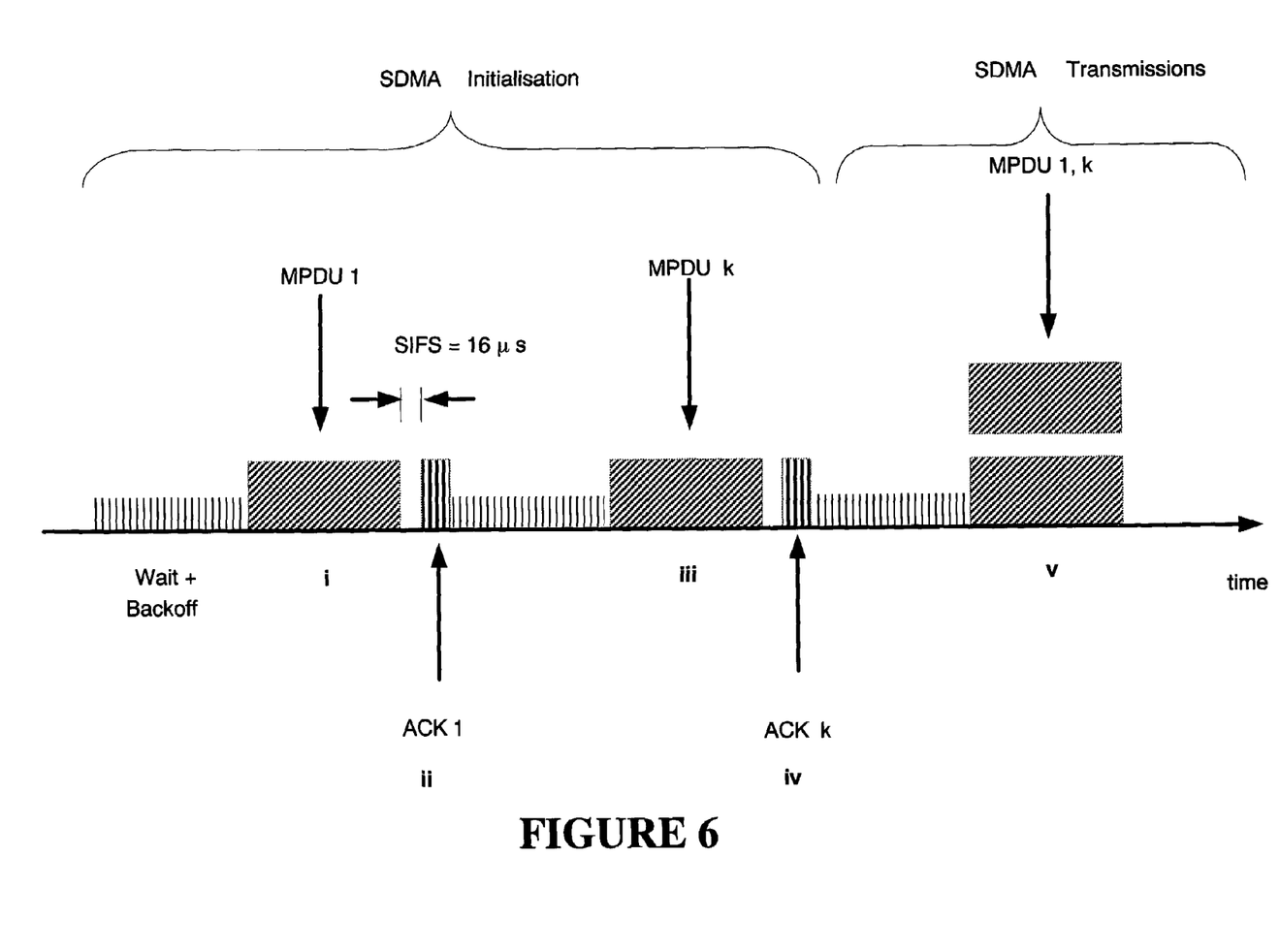
FIG. 6 illustrates a stylized representation of a timing chart to initialize the SDMA downlink for the SDMA transmissions shown in FIG. 5 according to one illustrative embodiment of the present invention.

Referring to FIG. 6, a stylized representation of a timing chart is illustrated to initialize the SDMA downlink 120$a$ for the SDMA transmissions shown in FIG. 5 according to one illustrative embodiment of the present invention. To this end, a "SDMA initialization" procedure is initiated prior to commencement of a SDMA mode of operation at the access point 105a. In one embodiment, this "SDMA initialization" procedure involves that:

(i). The access point 105a may transmit an MPDU to the first mobile station 145a(1) using equal weights at each antenna of the first and second antennas 110a(1-m).

(ii). Upon successful reception of the MPDU, the first mobile station 145a(1) may respond with an ACK frame burst. The access point 105a may use a pilot segment of the received ACK frame to compute a fresh estimate of the first radio channel 140(1).

(iii). The access point 105a may transmit an MPDU to the second mobile station 145a(k) using equal weights at each antenna of the first and second antennas 110a(1-m).

(iv). Upon successful reception of the MPDU, the second mobile station 145a(k) may respond with an ACK frame burst. The access point 105a may use the pilot segment of the received ACK frame to compute a fresh estimate the second radio channel 140(k).

(v). Channel estimates of the first and second radio channels 140(1-k) may then be used for SDMA transmissions, by the access point 105a, of the two independent MPDUs to the first and second mobile stations 145a(1-k), respectively.

An unsuccessful reception of the MPDUs or ACK frames at any stage (i) to (iv) would indicate that the radio conditions are unsuitable for the SDMA transmissions for the first and second mobile stations 145a(1-k) at this time. As a result, the current SDMA initialization procedure may then be abandoned, and a new SDMA initialization procedure may be commenced for a different pair of mobile stations.

Figure 7:
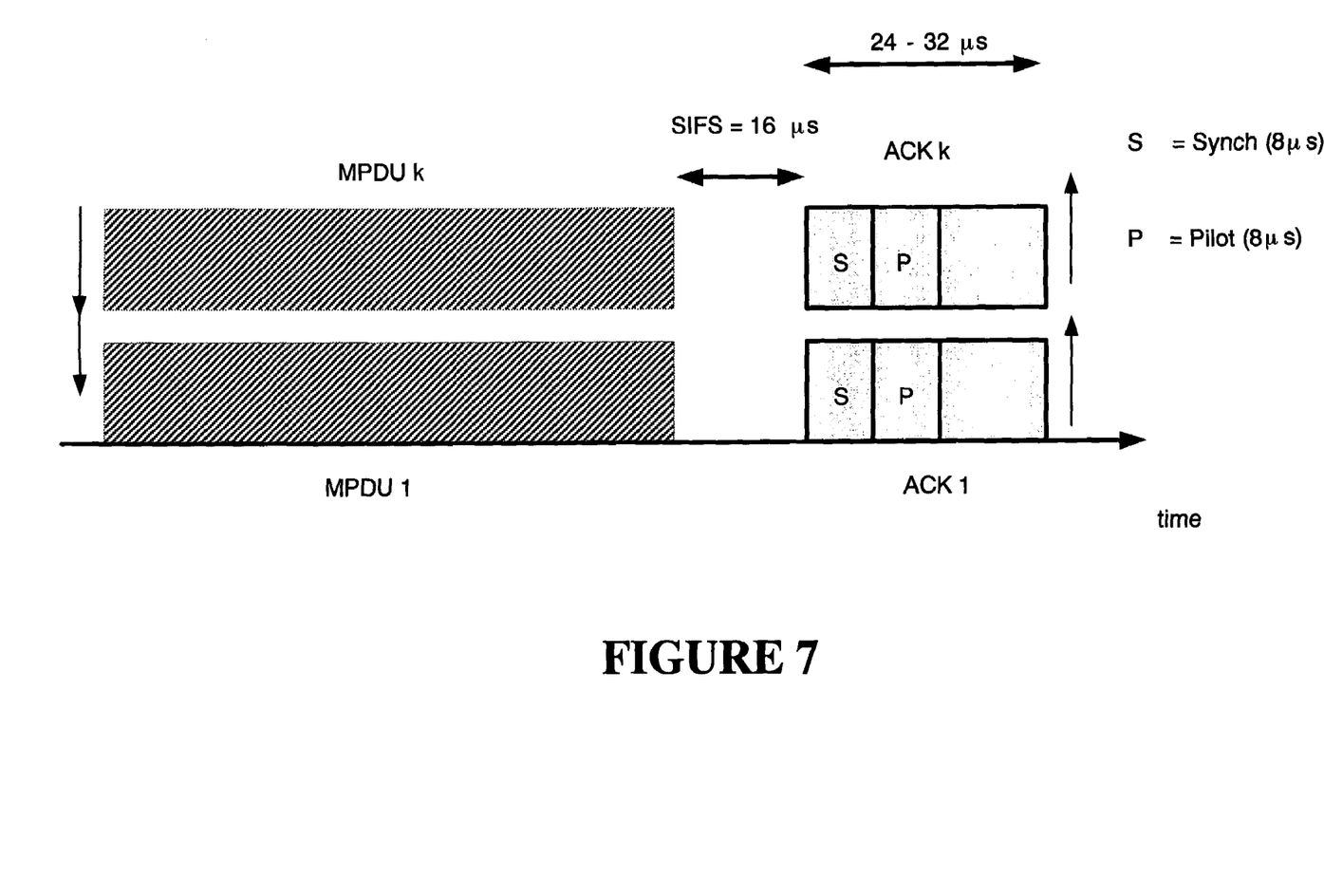
FIG. 7 illustrates a stylized representation of a timing chart that depicts overlap of two synchronization segments for simultaneous SDMA transmission of MPDUs to the first and second mobile stations during the SDMA transmissions shown in FIG. 5 in accordance with one illustrative embodiment of the present invention.

Turning now to FIG. 7, a stylized representation of a timing chart is illustrated that depicts overlap of two synchronization segments for simultaneous SDMA transmissions of MPDUs to the first and second mobile stations 145a(1-k) during the SDMA transmissions shown in FIG. 5 in accordance with one illustrative embodiment of the present invention. A simultaneous SDMA transmission of MPDUs (MPDU 1 and MPDU k) to the first and second mobile stations 145a(1-k) may result in each mobile responding, after a period of time called SIFS, such as 16 μs, with an ACK burst. However, the two ACK bursts (ACK 1 frame and ACK k frame) may substantially overlap in time and mutually interfere upon arrival at the access point 105a. Each ACK burst may comprise a synchronization (S), pilot (P) and data segments. Apart from confirming a successful reception of the MPDUs, the pilot segments of the ACK bursts may be used to derive fresh channel estimates of the first and second radio channels 140(1-k) in preparation for the next SDMA transmissions. While the overlap of the two pilot segments may severely impede channel estimation, the overlap of the two synchronization segments may also severely degrade synchronization, as depicted in FIG. 7.

Figure 8:
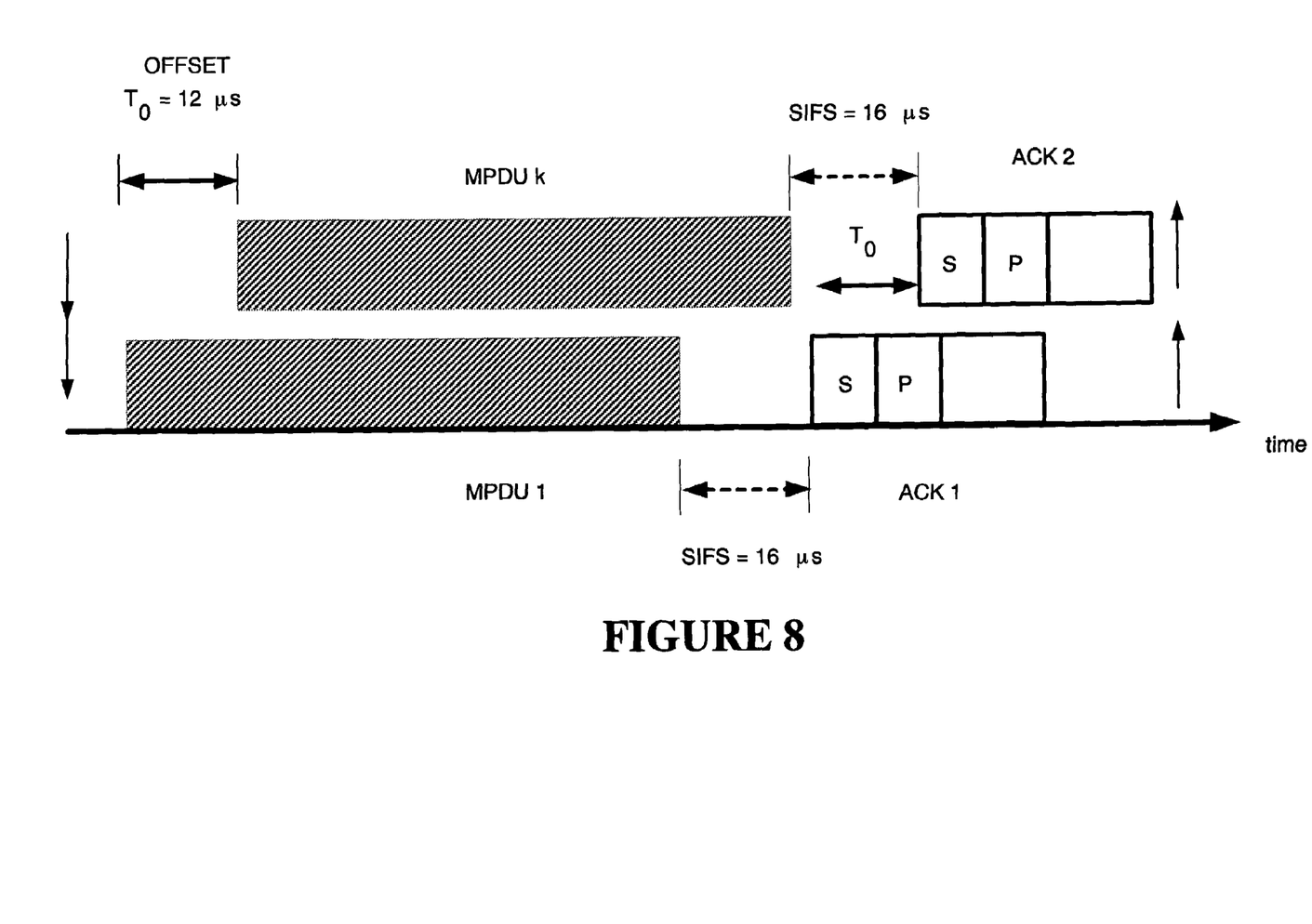
FIG. 8 illustrates a stylized representation of a timing chart to impose a time-offset between the SDMA transmitted MPDUs for the SDMA transmissions shown in FIG. 5 in accordance with one illustrative embodiment of the present invention.

To this end, FIG. 8 illustrates a stylized representation of a timing chart to impose a time-offset ($T_o$) between the SDMA transmitted MPDUs (MPDU 1 and MPDU k) for the SDMA transmissions shown in FIG. 5 in accordance with one illustrative embodiment of the present invention. The time-offset, $T_o$, between the SDMA transmitted MPDUs (MPDU 1 and MPDU k) may result in a similar time-offset in the ACK responses (ACK 1 frame and ACK k frame) of the first and second mobile stations 145a(1-k). This time-offset reduces the interference between the two ACK frames, in particular during the critical synchronization and pilot intervals of the ACK 1 frame. Ideally, in one embodiment, a maximum value of this time-offset is 16 μs with no simultaneous transmission (Tx) and reception (Rx) at the access point 105a or the first and second mobile stations 145a(1-k). However, to account for finite Tx/Rx switching times, a time-offset of 12 μs is used, as depicted in FIG. 8.

Consistent with one embodiment, the ACK responses (ACK 1 frame and ACK k frame) may be recovered via interference cancellation at the access point 105a. Specifically, the two partially overlapping ACK bursts may be recovered via a procedure described below.

i) Sample a received signal (e.g., at a Nyquist rate) synchronously with respect to the ACK 1 frame symbols. Synchronization may be achieved via the synchronization segment of ACK 1 frame.

ii) Compute an over-sampled replica of a filtered second radio channel 140(k) synchronization and pilot segments of the ACK 2 frame, with samples synchronous with respect to the ACK 2 frame symbols.

iii) Compute the contribution of the synchronization and pilot segments of the ACK 2 frame to the Nyquist-sampled received signal, e.g., by searching for the appropriate Nyquist-sampled polyphase component of the over-sampled signal and an associated appropriate time-offset.

iv) Subtract the contribution of the synchronization and pilot segments of the ACK 2 frame at stage (iii) from the Nyquist-sampled received signal at stage (i). This results in a "cleaned-up" Nyquist-sampled received signal with contributions from the ACK 1 frame only.

v) Estimate the ACK 1 frame symbols via conventional beam-forming using the first radio channel 140(1) estimates derived from previous ACK frames. If the detected ACK 1 frame symbols are in error, then the corresponding SDMA packet is lost.

vi) Over-sample the received signal and create an over-sampled replica of a filtered first radio channel 140(1) ACK 1 frame.

vii) Subtract the over-sampled replica of the ACK 1 frame from the over-sampled received signal and select the appropriate Nyquist-sampled polyphase component based on the result derived in stage (iii). This results in a "cleaned-up" Nyquist-sampled received signal with contributions from the ACK 2 frame only.

viii) Estimate the ACK 2 frame symbols by applying a conventional beam-forming to the result of stage (vii) using the second radio channel 140(k) estimates derived from previous ACK frames.

In this manner, both the first and second radio channels 140(1-k) may be estimated via the "cleaned" ACK frames at the output of a detector. However, since a non-delayed ACK 1 frame may be cleaned with a relatively more reliability than a delayed ACK 2 frame, the estimate of the first radio channel 140(1) derived from the ACK 1 frame may be a relatively more reliable than the estimate of the second radio channel 140(k) derived from the ACK 2 frame.

One of the reasons for this difference in channel estimates is that while pilot symbols are generally transmitted on all 52 OFDM sub-carriers, according to the IEEE 802.11 specifications, synchronization symbols are generally transmitted only on 12 (roughly equi-spaced) sub-carriers out of the total of 52 OFDM sub-carriers. This means that the synchronization segment of the ACK 2 frame may interfere only with 12 sub-carriers of the pilot segment of the ACK 1 frame. In contrast, the 52 sub-carriers of the data segment of the ACK 1 frame may interfere with all 52 sub-carriers of the pilot segment of the ACK 2 frame. However, a poor quality of the second radio channel 140(k) estimates may have a severe impact on a successful application of the SDMA module 170 shown in FIG. 1 to the transmission protocol 165.

Figure 9:
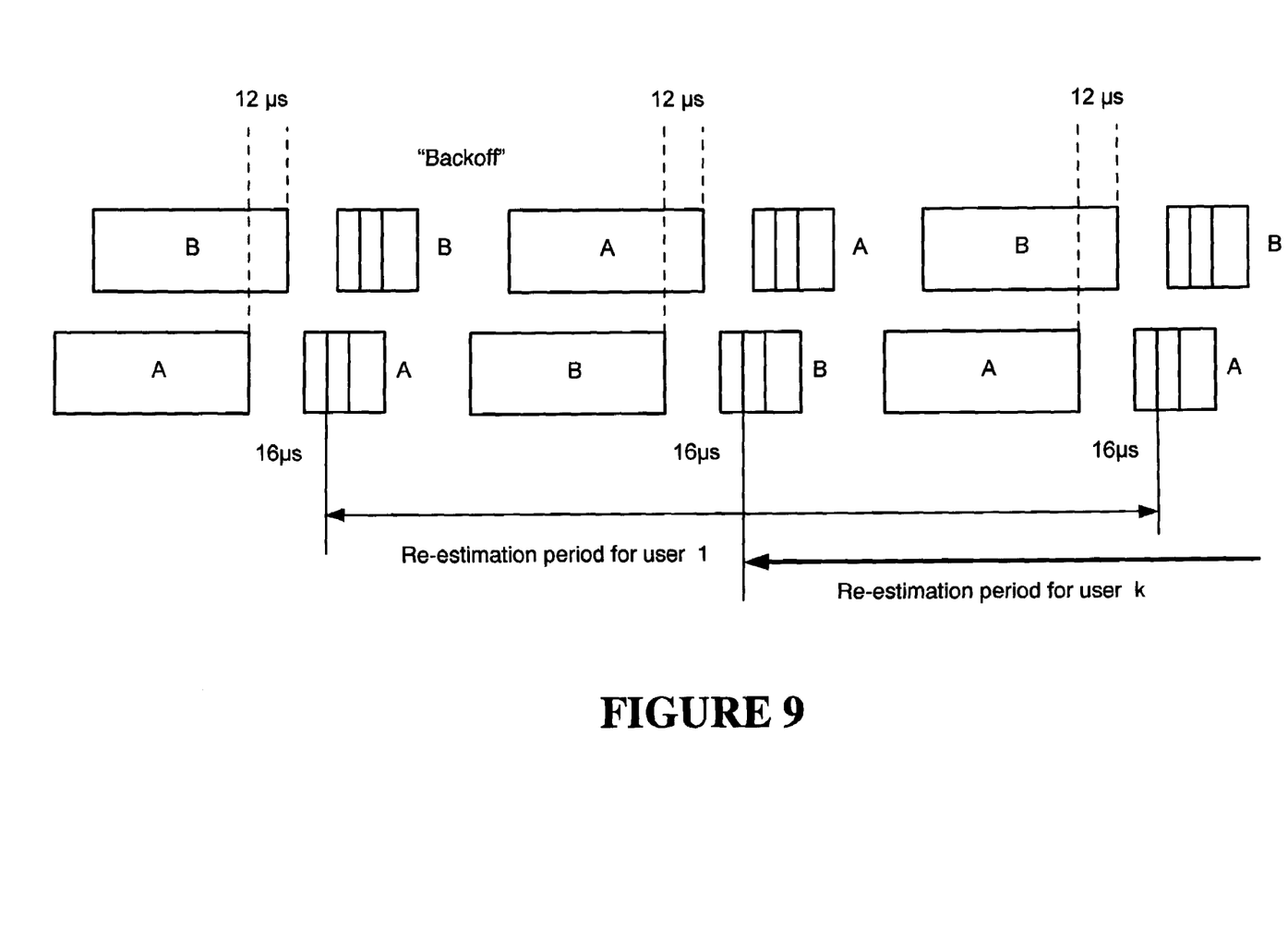
FIG. 9 illustrates a stylized representation of a timing chart for channel estimation and alternating time-offset on the SDMA downlink to estimate a first radio channel associated with a reliably-recovered non-delayed first acknowledgement frame (ACK) such that identity of a user associated with the non-delayed MPDUs and ACKs be switched for successive SDMA transmissions shown in FIG. 5 consistent with an embodiment of the present invention.

According to one exemplary embodiment of the present invention, FIG. 9 illustrates a stylized representation of a timing chart for channel estimation and alternating time-offset on the SDMA downlink 120a to estimate the first radio channel 140(1) associated with a reliably-recovered non-delayed first acknowledgement frame (ACK 1) such that identity of a user associated with the non-delayed MPDUs and ACK frames be switched for successive SDMA transmissions shown in FIG. 5. Using channel estimation and alternating time-offset, the above issue of difference in channel estimates may be addressed by estimating only the first radio channel 140(1) associated with the reliably-recovered non-delayed ACK 1 frame. The identity of the user associated with the non-delayed MPDUs and ACK frames may then be switched for successive SDMA transmissions. This technique of channel estimates is depicted in FIG. 9 for the first and second mobile stations 145a(1-k), shown as mobiles A and B.

As illustrated above, estimation of the first radio channel 140(1) via the pilot segment of the ACK 1 frame is subject to interference from the strong synchronization or overlap segment of the ACK 2 frame. This interference may result in inadequate estimates of the first radio channel 140(1), subsequently affecting the recovery of the ACK frame. In one embodiment, the quality of the channel estimates may be improved by exploiting the characteristics of the synchronization (S) segment.

More specifically, while pilot symbols are generally transmitted on all 52 OFDM sub-carriers, according to the IEEE 802.11 specifications, synchronization symbols are transmitted only in 12 (roughly equi-spaced) sub-carriers out of the total of 52 OFDM sub-carriers. This means that the synchronization segment of the ACK 2 frame may interfere only with 12 sub-carriers of the pilot segment of the ACK 1 frame. Thus, the remaining 40 sub-carriers of the pilot segment of the ACK 1 frame may be uncorrupted. This feature may be used to improve the quality of the first radio channel 140(1) estimates by avoiding the use of the corrupted ACK 1 frame pilot symbols on the 12 sub-carriers.

As examples, two different techniques are described below. A first technique for channel estimates involves interpolation in the frequency domain. In the first technique, to compute estimates of the first radio channel 140(1) at the corresponding sub-carrier frequencies, the pilot symbols of the ACK 1 frame transmitted on the 40 uncorrupted sub-carriers may be used. Due to the absence of interference from the synchronization segment of the ACK 2 frame at these sub-carriers, a relatively higher quality of channel estimates may be obtained. Using the computed channel estimates interpolation in the frequency domain may be applied to compute estimates of the first radio channel 140(1) at the 12 remaining sub-carriers.

A second technique for channel estimates involves channel estimation via synchronization symbols. Again, by using the pilot symbols of the ACK 1 frame transmitted on the 40 uncorrupted sub-carriers, channel estimates of the first radio channel 140(1) may be computed at the corresponding sub-carrier frequencies. Due to the absence of interference from the synchronization segment of the ACK 2 frame at these sub-carriers, a significantly better quality of channel estimates may be obtained. By using the strong synchronization symbols of the ACK 1 frame (rather than the pilot symbols), channel estimates of the first radio channel 140(1) may be computed at the 12 remaining sub-carriers. The synchronization segment of the ACK 1 frame may not at all overlap with the ACK 2 frame, resulting in a relatively higher quality channel estimates.

In scenarios where a sequence of the SDMA transmissions on the SDMA downlink 120a may be interrupted by other IEEE 802.11 mobiles or access points contending for a same channel, a reservation process may be performed via the point coordination function (PCF) specified in the IEEE 802.11 standard. As a result, an SDMA initialization process would not be initiated every interruption. Thus, any associated overhead with an interruption would not impact the throughput gains achieved by the relatively higher quality channel estimates on the SDMA downlink 120a.

Figure 10:
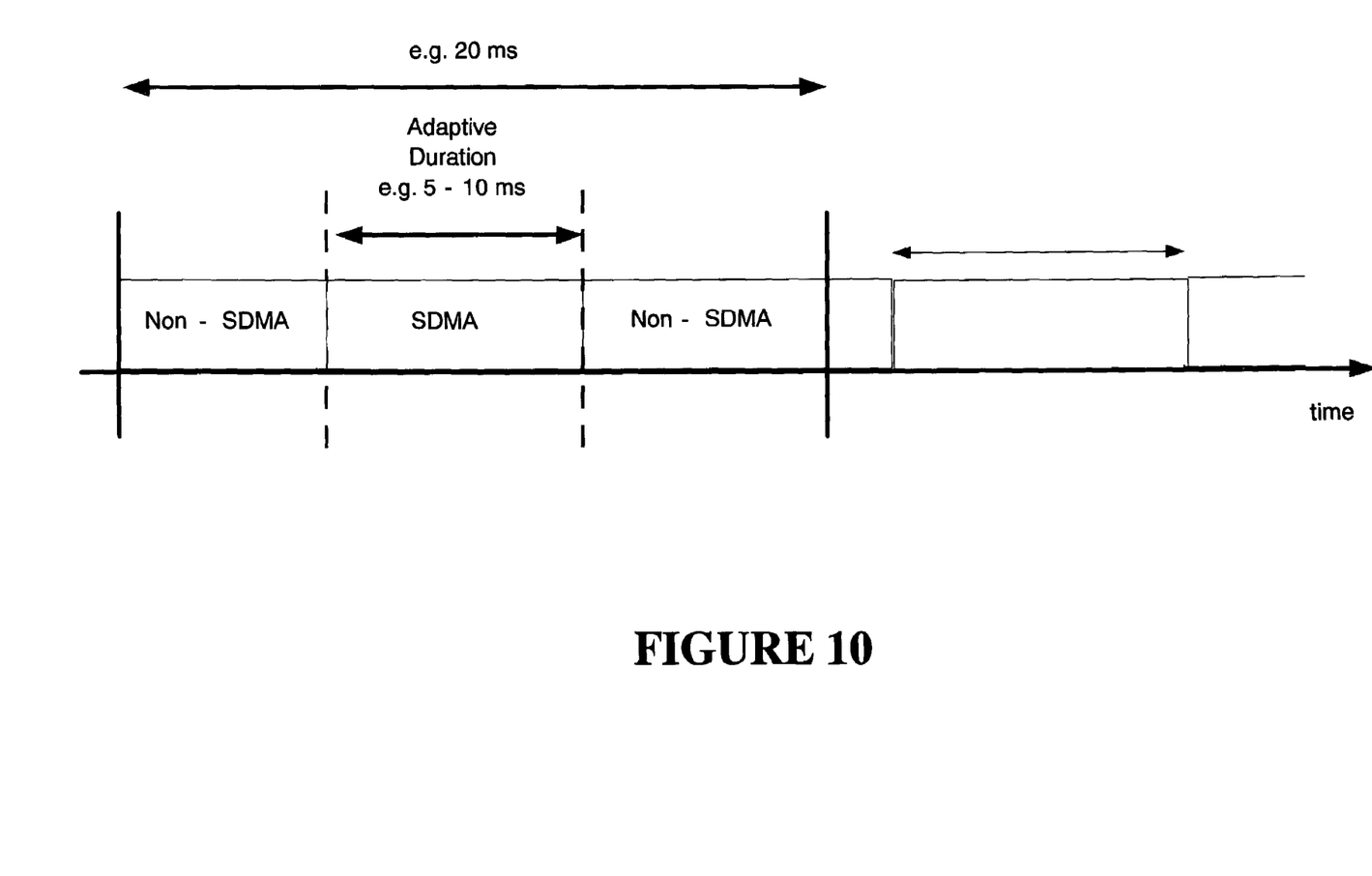
FIG. 10 illustrates a stylized representation of a timing chart for channel reservation for the SDMA transmissions shown in FIG. 5 that uses time division multiple access (TDMA) to partition a radio resource across SDMA and non-SDMA modes of the communication node (e.g., an access point) operation in accordance with an embodiment of the present invention.

To this end, FIG. 10 illustrates a stylized representation of a timing chart for channel reservation for the SDMA transmissions shown in FIG. 5 that uses time division multiple access (TDMA) to partition a radio resource across SDMA and non-SDMA modes of the communication node (e.g., an access point) operation in accordance with one illustrative embodiment of the present invention. The non-SDMA mode may represent a conventional IEEE 802.11 mode that services uplink (UL)/downlink (DL) real-time traffic. When the access point 105a contends for the SDMA mode, the access point 105a reserves a channel for the SDMA mode. The SDMA downlink 120a may carry non-real-time traffic for multiple mobile pairs since many scheduling options may be possible. A reservation interval may depend upon the mix of traffic, for example, 5-10 ms may allow efficient SDMA transmissions on the SDMA downlink 120a. Upon completion of the SDMA mode, the access point 105a may release the channel and revert back to conventional IEEE 802.11 non-SDMA mode, servicing remaining uplink (UL)/downlink (DL) real-time traffic.

In some embodiments, advantageously the present invention may be adopted at the access point 105a for substantially increasing the SDMA downlink 120a throughput in an IEEE 802.11 cell such that the increase in the throughput involve no modification to IEEE 802.11 standard compliant mobile stations. For example, a near doubling of the throughput via two antennas at the access point 105a may be obtained. In other embodiments, the use of the present invention may avoid the overlap of the mobile station acknowledgement (ACK) bursts upon their arrival at the access point 105a, providing increased throughputs to IEEE 802.11 mobile stations. Furthermore, a doubling of data rates using a single carrier frequency may be obtained on the SDMA downlink 120a for the IEEE 802.11 mobile stations.

While the invention has been illustrated herein as being useful in a telecommunications network environment, it also has application in other connected environments. For example, two or more of the devices described above may be coupled together via device-to-device connections, such as by hard cabling, radio frequency signals (e.g., 802.11(a), 802.11(b), 802.11(g), Bluetooth, or the like), infrared coupling, telephone lines and modems, or the like. The present invention may have application in any environment where two or more users are interconnected and capable of communicating with one another.

Those skilled in the art will appreciate that the various system layers, routines, or modules illustrated in the various embodiments herein may be executable control units. The control units may include a microprocessor, a microcontroller, a digital signal processor, a processor card (including one or more microprocessors or controllers), or other control or computing devices as well as executable instructions contained within one or more storage devices. The storage devices may include one or more machine-readable storage media for storing data and instructions. The storage media may include different forms of memory including semiconductor memory devices such as dynamic or static random access memories (DRAMs or SRAMS), erasable and programmable read-only memories (EPROMs), electrically erasable and programmable read-only memories (EEPROMs) and flash memories; magnetic disks such as fixed, floppy, removable disks; other magnetic media including tape; and optical media such as compact disks (CDs) or digital video disks (DVDs). Instructions that make up the various software layers, routines, or modules in the various systems may be stored in respective storage devices. The instructions, when executed by a respective control unit, causes the corresponding system to perform programmed acts.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

We claim:

1. A method for communicating data over a network between an access point having a first and a second antenna and a first and a second mobile station, the method comprising:
   weighting a first data at said access point to transmit said first data using said first and second antennas so that said first mobile station only receives said first data; and
   weighting a second data at said access point to transmit said second data using said first and second antennas so that said second mobile station only receives said second data;
   increasing a first data rate of transmission of said first data and a second data rate of transmission of said second data using a single carrier frequency in a radio frequency communication based on a transmission protocol;
   discriminating transmissions of said first and said second data on a downlink in said radio frequency communication based on a spatial dimension;
   applying a space division multiple access based on said transmission protocol to said transmissions to transmit said first and said second data substantially concurrently from said access point to said first and second mobile stations, respectively;
   defining at least one of said access point, said first and second mobile stations, and said downlink at least in part by Institute of Electrical and Electronics Engineers (IEEE) 802.11 standard to establish said network including a wireless local area network;
   coupling said access point to said first and second mobile stations through said wireless local area network;
   estimating a first radio channel from said access point to said first mobile station over a pilot interval; and
   estimating a second radio channel from said access point to said second mobile station over said pilot interval.

2. A method, as set forth in claim 1, further comprising:
   initializing said transmission protocol before starting said transmissions of said first and second data over said downlink.

3. A method, as set forth in claim 2, wherein initializing said transmission protocol further comprising:
   exchanging one or more protocol data units and one or more acknowledgement frames between said access point and said first mobile station and said second mobile station.

4. A method, as set forth in claim 3, wherein initializing said transmission protocol further comprising:
   offsetting transmission of a first protocol data unit of said one or more protocol data units from said access point to said first mobile station relative to transmission of a second protocol data unit of said one or more protocol data units from said access point to said second mobile station by a predetermined time.

5. A method, as set forth in claim 3, wherein initializing said transmission protocol further comprising:
   shifting transmission of said first data relative to transmission of said second data; and
   canceling an interference based on synchronization between a first and a second acknowledgement frame of said one or more acknowledgement frames at said access point to recover said first acknowledgement frame that at least partially overlaps said second acknowledgement frame based on the shifted transmissions of said first and second data.

6. A method, as set forth in claim 5, further comprising:
   re-estimating said first radio channel associated with the recovered said first acknowledgement frame.

7. A method, as set forth in claim 6, further comprising:
   receiving one or more pilot symbols and one or more synchronization symbols of said first acknowledgement frame on a set of uncorrupted sub-carriers of a multiplicity of sub-carriers;
   computing estimates of said first radio channel at the uncorrupted sub-carrier frequencies based on at least one of the pilot symbols and the synchronization symbols of said first acknowledgement frame received on the multiplicity uncorrupted sub-carriers; and
   computing estimates of said first radio channel at a set of corrupted sub-carriers of said multiplicity of sub-carriers using the computed estimates at the uncorrupted sub-carrier frequencies.

8. A method, as set forth in claim 7, wherein computing estimates of said first radio channel at a set of corrupted sub-carriers of said multiplicity of sub-carriers using the computed estimates at the uncorrupted sub-carrier frequencies further comprises:
   applying interpolation in a frequency domain based on the computed channel estimates to compute estimates of said first radio channel at a set of corrupted sub-carriers of said multiplicity of sub-carriers.

9. A method, as set forth in claim 7, wherein computing estimates of said first radio channel at a set of corrupted sub-carriers of said multiplicity of sub-carriers using the computed estimates at the uncorrupted sub-carrier frequencies further comprises:
   computing estimates of said first radio channel at a set of corrupted sub-carriers of said multiplicity of sub-carriers based on the synchronization symbols of said first acknowledgement frame.

10. A method, as set forth in claim 3, further comprising:
    using a time division multiple access protocol to partition a radio resource including a channel across a space division multiple access mode and a non-space division multiple access mode of said access point; and
    reserving a portion of said channel for a transmission based on said space division multiple access protocol in said space division multiple access mode of said access point.

11. A method, as set forth in claim 3, wherein initializing said transmission protocol further comprises:
    delaying transmission of a first one of the protocol data units from said access point to said first mobile station relative to transmission of a second one of the protocol data units from said access point to said second mobile station by a predetermined time during a first period of operation; and delaying transmission of a third one of the protocol data units from said access point to said second mobile station relative to transmission of a fourth one of the protocol data units from said access point to said first mobile station by a predetermined time during a second period of operation.

12. A method, as set forth in claim 3, wherein initializing said transmission protocol further comprises:

alternately delaying transmissions of the protocol data units from the access point to the first and second mobile stations, respectively.

13. A method, as set forth in claim 3, wherein initializing said transmission protocol further comprises:

transmitting the protocol data units to the first and second mobile stations in a first preselected order during a first period of time and a second preselected order during a second period of time.

* * * * *